US008386107B2

(12) United States Patent
Shimanaka (10) Patent No.: US 8,386,107 B2
(45) Date of Patent: Feb. 26, 2013

(54) CONTROL APPARATUS FOR HYBRID VEHICLE

(75) Inventor: Shigeki Shimanaka, Hadano (JP)

(73) Assignee: Jatco Ltd, Fuji-shi (JP)

( * ) Notice: Subject to any disclaimer, the term of this patent is extended or adjusted under 35 U.S.C. 154(b) by 333 days.

(21) Appl. No.: 12/901,022

(22) Filed: Oct. 8, 2010

(65) Prior Publication Data

US 2011/0087394 A1 Apr. 14, 2011

(30) Foreign Application Priority Data

Oct. 9, 2009 (JP) ................................ 2009-234936

(51) Int. Cl.
*F16H 59/36* (2006.01)
*G06F 19/00* (2006.01)
(52) U.S. Cl. ...................................... 701/22; 180/65.25
(58) Field of Classification Search .................... 701/22, 701/70; 180/65.25; 903/902, 905, 906, 917
See application file for complete search history.

(56) References Cited

U.S. PATENT DOCUMENTS

| 7,360,616 | B2 | 4/2008 | Schiele | |
|---|---|---|---|---|
| 7,383,902 | B2 * | 6/2008 | Matsuzaki et al. | 180/65.285 |
| 7,975,791 | B2 * | 7/2011 | Nozaki et al. | 180/65.6 |
| 2004/0090116 | A1 * | 5/2004 | Tsunehara | 303/152 |
| 2004/0163860 | A1 * | 8/2004 | Matsuzaki et al. | 180/65.2 |
| 2005/0155803 | A1 | 7/2005 | Schiele | |
| 2009/0181821 | A1 | 7/2009 | Henneken et al. | |

FOREIGN PATENT DOCUMENTS

| DE | 10 2008 000 046 A1 | 7/2009 |
|---|---|---|
| EP | 1 785 305 A2 | 5/2007 |
| JP | 2005-221073 A | 8/2005 |

* cited by examiner

*Primary Examiner* — Tan Q Nguyen
(74) *Attorney, Agent, or Firm* — Foley & Lardner LLP

(57) ABSTRACT

A control apparatus of hybrid vehicle has a drive mode change section, a deceleration detection section, an engine stall prevention control section, an engine stall prediction section, and an engine stall avoidance control section. The drive mode change section changes drive modes of EV drive mode, HEV drive mode and WSC drive mode according to a vehicle travel state. The engine stall prevention control section performs a coast-down shift which changes a transmission ratio of an automatic transmission to a lower transmission ratio upon deceleration of the vehicle. The engine stall prediction section predicts whether or not an engine stall occurs, during a travel in a HEV drive mode. The engine stall avoidance control section disengages at least one of first and second engagement elements when the occurrence of the engine stall is predicted by the engine stall prediction section.

6 Claims, 6 Drawing Sheets

CONTROL APPARATUS FOR HYBRID VEHICLE

BACKGROUND OF THE INVENTION

The present invention relates to a control apparatus for a hybrid vehicle which has a plurality of drive modes and changes the drive mode according to predetermined conditions.

In recent years, there have been proposed and developed various control apparatuses for the hybrid vehicle in which a first engagement element to connect/disconnect an engine and a motor and a second engagement element to connect/disconnect the motor and driving wheels are provided. The hybrid vehicle has, as drive modes, a motor-use drive mode (hereinafter called "EV drive mode") in which the vehicle travels with only the motor being a power source and an engine-use drive mode (hereinafter called "HEV drive mode") in which the vehicle travels with the engine included as the power source. In such control apparatuses, for example, Japanese Patent Provisional Publication No. 2005-221073 (hereinafter is referred to as "JP2005-221073") discloses a control apparatus of the hybrid vehicle which increases gas mileage by changing the drive mode in accordance with a vehicle condition and a traveling condition.

In such hybrid vehicles, when a required driving force by a driver is high, the vehicle could start using both driving forces of the engine and the motor to meet the driver's required driving force at the vehicle start. In this case, since there is no element such as a torque converter which serves to absorb input rotation speed and change of the rotation speed, when the vehicle starts with the first and second engagement elements completely engaged, a vehicle speed is determined according to an engine rotation speed. On the other hand, regarding the engine, there is a lower limit value of an idle rotation speed for maintaining a self-rotation of the engine. Under a condition in which an idle-up control by engine warming-up etc. is being carried out, this lower limit value of the idle rotation speed becomes even higher.

Therefore, at the vehicle start when the driver's required driving force is high, it is required to fulfill a rotation absorption function while meeting the required driving force. Also, during such an extremely low speed travel that the engine rotation speed falls below the lower limit value of the idle rotation speed, it is required to fulfill the rotation absorption function while meeting a demand for engine stall avoidance. Thus, by performing a slip-control of the second engagement element installed on a driveline between the motor and the driving wheels while maintaining the engagement of the first engagement element, the vehicle start and travel using the engine also the extremely low speed travel can be realized. This drive mode is called "WSC (Wet Start Clutch) drive mode".

SUMMARY OF THE INVENTION

In general, in a case of the vehicle having an automatic transmission on the driveline, during deceleration, in order for the engine rotation speed not to fall below the idle rotation speed, a coast-down shift is performed.

In such a hybrid vehicle as disclosed in JP2005-221073, during an abrupt deceleration in the HEV drive mode, in order to avoid the engine stall, the coast-down shift is quickly performed, and the WSC drive mode is started after completing down-shift to $1^{st}$ speed. The reason why the WSC drive mode is started after performing the down-shift to $1^{st}$ speed by the coast-down shift is that, if a shift control and the slip-control are performed at the same time, a hydraulic pressure control becomes complex, and this control is technically extraordinarily difficult.

In the above related art hybrid vehicle, however, in a case of the abrupt deceleration with an extremely rapid deceleration, there arises a case where the down-shift to $1^{st}$ speed is not completed before the engine rotation speed becomes the idle rotation speed or less then the subsequent WSC drive mode is not started. That is, there is a risk that the engine stall will occur during the abrupt deceleration with the extremely rapid deceleration.

For this problem, it is therefore an object of the present invention to provide a control apparatus for the hybrid vehicle, which can avoid the occurrence of the engine stall by a pre-control based on an accurate prediction of the occurrence of the engine stall, during the deceleration by the HEV drive mode in which the hybrid vehicle travels using the both driving forces of the engine and the motor.

According to one aspect of the present invention, a control apparatus of a hybrid vehicle, the hybrid vehicle having, an engine, a motor, driving wheels, an automatic transmission arranged between the motor and the driving wheels, a first engagement element arranged between the engine and the motor for connecting/disconnecting the engine and the motor, and a second engagement element arranged between the motor and the driving wheels for connecting/disconnecting the motor and the driving wheels, the control apparatus comprises: a drive mode change section that changes the following drive modes according to a vehicle travel state: a first drive mode in which the first engagement element is disengaged and the second engagement element is engaged then the vehicle travels by only a driving force of the motor, a second drive mode in which the first and second engagement elements are respectively engaged then the vehicle travels by both driving forces of the engine and the motor, and a third drive mode in which at least the second engagement element is slip-engaged then the vehicle travels by a driving force transmitted through the second engagement element; a deceleration detection section that detects a deceleration of the vehicle; an engine stall prevention control section that performs a coast-down shift which changes a transmission ratio of the automatic transmission to a lower transmission ratio upon deceleration of the vehicle; an engine stall prediction section that predicts whether or not an engine stall occurs, on the basis of the vehicle deceleration detected by the deceleration detection section and a state of the coast-down shift by the engine stall prevention control section, during a travel in the second drive mode; and an engine stall avoidance control section that disengages at least one of the first and second engagement elements when the occurrence of the engine stall is predicted by the engine stall prediction section.

According to another aspect of the invention, a method for controlling a hybrid vehicle, the hybrid vehicle having an engine, a motor, an automatic transmission, a first engagement element arranged between the engine and the motor for connecting/disconnecting the engine and the motor, and a second engagement element arranged on a driveline from the motor to driving wheels through the automatic transmission for connecting/disconnecting the motor and the driving wheels, and having the following drive modes: a first drive mode in which the first engagement element is disengaged and the second engagement element is engaged then the vehicle travels by only a driving force of the motor, a second drive mode in which the first and second engagement elements are respectively engaged then the vehicle travels by both driving forces of the engine and the motor, and a third drive mode in which at least the second engagement element is slip-engaged then the vehicle travels by a driving force transmitted through the second engagement element, the method comprises: changing the drive mode according to a vehicle travel state; detecting a deceleration of the vehicle; performing a coast-down shift which changes a transmission ratio of the automatic transmission to a lower transmission ratio upon deceleration of the vehicle; predicting whether or not an engine stall occurs, on the basis of the vehicle deceleration and a state of the coast-down shift, during a travel in the second drive mode; and disengaging at least one of the first and second engagement elements when the occurrence of the engine stall is predicted.

The other objects and features of this invention will become understood from the following description with reference to the accompanying drawings.

DETAILED DESCRIPTION OF THE INVENTION

According to a control apparatus of a hybrid vehicle of the present invention, during a travel in a second drive mode, an engine stall prediction section predicts whether or not an engine stall occurs, on the basis of a detected vehicle deceleration and a state of coast-down shift. Then when the occurrence of the engine stall is predicted, an engine stall avoidance control section disengages at least one of first and second engagement elements.

By the coast-down shift carried out by an engine stall prevention control section upon deceleration of the vehicle, an input rotation speed of an automatic transmission is increased, then an engine rotation speed does not fall below an idle rotation speed.

Thus, in a case where this down-shift continues as it is, by checking the state of the coast-down shift upon the deceleration of the vehicle, a state of engine rotation speed change can be known or grasped, namely that it is possible to check whether the engine rotation speed can be maintained above the idle rotation speed or falls below the idle rotation speed. Therefore, it becomes possible to accurately predict whether the occurrence of the engine stall can be avoided or cannot be avoided.

Further, on the basis of this accurate prediction of the occurrence of the engine stall, a pre-control that disengages at least one of the first and second engagement elements is performed at a time at which the occurrence of the engine stall is predicted. With this, when the engagement element is disengaged, the engine is disconnected from a driveline which is a load for the engine. Also, when the engagement element is slip-engaged, a difference rotation between the engine rotation speed and a driving wheel rotation speed is tolerated or absorbed. The occurrence of the engine stall can be consequently avoided.

Accordingly, upon the deceleration by the second drive mode (HEV drive mode) in which the vehicle travels by both driving forces of the engine and a motor, by the pre-control based on the accurate prediction of the occurrence of the engine stall, the occurrence of the engine stall can be avoided.

Embodiments of the present invention will now be explained below with reference to the drawings.

[Embodiment 1]

Figure 1:
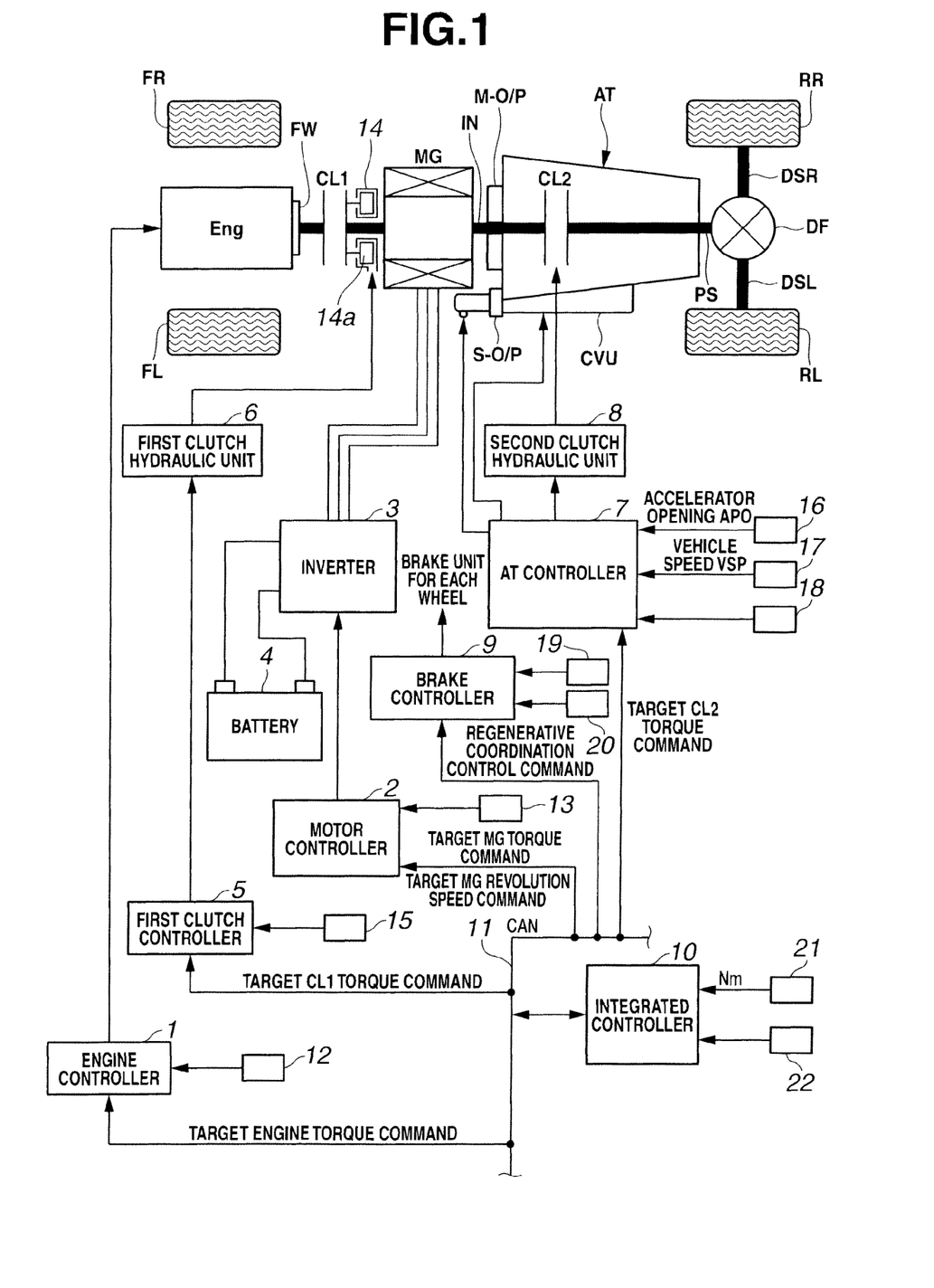
FIG. 1 is a system block diagram showing a rear-wheel-drive FR hybrid vehicle (an example of the hybrid vehicle) employing a control apparatus of an embodiment 1.

First, the whole system of the present invention will be explained. FIG. 1 is a system block diagram showing a rear-wheel-drive FR hybrid vehicle (an example of the hybrid vehicle) employing a control apparatus of an embodiment 1.

As can be seen in FIG. 1, a driveline of the FR hybrid vehicle in the embodiment 1 has an engine Eng, a flywheel FW, a first clutch CL1 (a first engagement element), a motor/generator MG (a motor), a second clutch CL2 (a second engagement element), an automatic transmission AT, a transmission input shaft IN, a mechanical oil pump M-O/P (a first oil pump), a sub-oil pump S-O/P (a second oil pump), a propeller shaft PS, a differential gear DF, a left drive shaft DSL, a right drive shaft DSR, a rear-left wheel (driving wheel) RL, and a rear-right wheel (driving wheel) RR. FL is a front-left wheel, FR is a front-right wheel.

The engine Eng is a gasoline engine or a diesel engine, and the flywheel FW is provided on an engine output shaft. On the basis of an engine control command from an engine controller 1, an engine start control, an engine stop control, a valve opening control of a throttle valve and a fuel cut control etc. are carried out.

The first clutch CL1 is arranged between the engine Eng and the motor/generator MG. Engagement/slip-engagement (half clutch or partial clutch engagement)/disengagement, of the first clutch CL1, are controlled by a first clutch control pressure that is produced by a first clutch hydraulic unit 6 on the basis of a first clutch control command from a first clutch controller 5. As the first clutch CL1, for example, a normally-closed dry single disc clutch is used. The normally-closed dry single disc clutch is urged by a diaphragm spring and its complete engagement is held by this spring force. Further, clutch control from the slip-engagement to complete disengagement is carried out by a stroke control using a hydraulic actuator 14 having a piston 14a.

The motor/generator MG is a synchronous motor/generator in which a permanent magnet is embedded in a rotor and a stator coil is wound around a stator. On the basis of a control command from a motor controller 2, the motor/generator MG is controlled through the application of a three-phase alternating current that is generated by an inverter 3. This motor/generator MG works as an electric motor that performs a rotational drive operation by receiving a power from a battery 4 (hereinafter, this state is called a power running state). And also, in a case where the rotor is rotated by receiving a rotational energy from the engine Eng or the driving wheels, the motor/generator MG works as a generator that generates an electromotive force at both ends of the stator coil, and is able to charge the battery 4 (hereinafter, this operating state is called a regenerative state). The rotor of this motor/generator MG is connected to the transmission input shaft IN of the automatic transmission AT.

The second clutch CL2 is arranged between the motor/generator MG and the rear left and right wheels RL, RR. Engagement/slip-engagement/disengagement, of the second clutch CL2, are controlled by a control pressure that is produced by a second clutch hydraulic unit 8 on the basis of a second clutch control command from an AT controller 7. As the second clutch CL2, for example, a normally-open wet multiple disc clutch or wet multiple disc brake, which is capable of continuously controlling an oil flow amount and the oil pressure through a proportional solenoid, is used. Here, the first clutch hydraulic unit 6 and the second clutch hydraulic unit 8 are built into an AT hydraulic control valve unit CVU that is provided in the automatic transmission AT.

The automatic transmission AT is a multi-range transmission that automatically changes a shift position of multispeed (multistage) of, for example, forward 7 speeds and reverse 1 speed according to a vehicle speed and an accelerator opening and so on. Here, the above second clutch CL2 is not a clutch that is newly added as a special clutch, but an optimum clutch or brake that is arranged on a torque transmission path of the driveline, among a plurality of frictional engagement elements which are engaged in each speed or each shift stage in the automatic transmission AT, is selected as the second clutch CL2.

The mechanical oil pump M-O/P driven by the transmission input shaft IN is provided at the transmission input shaft IN (=a motor shaft) of the automatic transmission AT. Further, the sub-oil pump S-O/P driven by an electric motor is provided, for example, at a motor housing, to suppress reduction of oil pressure when a discharge pressure from the mechanical oil pump M-O/P is insufficient due to a vehicle stop etc. A drive control of the sub-oil pump S-O/P is carried out by the after-mentioned AT controller 7.

A transmission output shaft of the automatic transmission AT is connected to the propeller shaft PS. This propeller shaft PS is connected to the rear left and right wheels RL, RR through the differential gear DF, the left drive shaft DSL and the right drive shaft DSR.

The driveline in the hybrid vehicle in the embodiment 1 has drive modes such as an electric vehicle drive mode (hereinafter called EV drive mode), a hybrid vehicle drive mode (hereinafter called HEV drive mode) and a driving torque control drive mode (hereinafter called WSC drive mode).

The EV drive mode (a first drive mode) is a mode in which the first clutch CL1 is disengaged and the vehicle travels by only a driving force of the motor/generator MG. The EV drive mode includes a motor drive mode and a regenerative drive mode.

The HEV drive mode (a second drive mode) is a mode in which the vehicle travels with the first clutch CL1 engaged. The HEV drive mode includes a motor assist drive mode, an electric power generation drive mode and an engine drive mode.

The WSC drive mode (a third drive mode) is a mode in which the vehicle travels while maintaining the slip-engagement of the second clutch CL2 by a revolution speed control of the motor/generator MG and controlling a clutch torque capacity so that a clutch transmission torque transmitted through the second clutch CL2 is a required driving torque determined in accordance with a vehicle condition and driver's operation. This WSC drive mode is selected when a travelling state is in such a drive operating area that an engine rotation speed falls below an idle rotation speed, such as a vehicle start area from a vehicle stop to a certain vehicle speed or a deceleration stop area from the certain vehicle speed to the vehicle stop, under a condition in which the HEV drive mode is selected.

Next, a control system of the hybrid vehicle will be explained.

As shown in FIG. 1, the control system of the FR hybrid vehicle has the engine controller 1, the motor controller 2, the inverter 3, the battery 4, the first clutch controller 5, the first clutch hydraulic unit 6, the AT controller 7 (a shift control means), the second clutch hydraulic unit 8, a brake controller 9, and an integrated controller 10. Here, the engine controller 1, the motor controller 2, the first clutch controller 5, the AT controller 7, the brake controller 9 and the integrated controller 10 are connected with each other through a CAN (Controller Area Network) communication line 11 that allows an information exchange between controllers.

The engine controller 1 inputs engine rpm information from an engine rpm sensor 12 and a target engine torque command from the integrated controller 10, also inputs the other information. Then the engine controller 1 outputs a command that controls an engine operating point (Ne, Te) to a throttle valve actuator etc. of the engine Eng.

The motor controller 2 inputs information from a resolver 13 that detects a rotor rotational position of the motor/generator MG, a target MG torque command and a target MG revolution speed command from the integrated controller 10, also inputs the other information. Then the motor controller 2 outputs a command that controls a motor operating point (Nm, Tm) of the motor/generator MG to the inverter 3. In addition, the motor controller 2 measures or checks a battery SOC that indicates a capacity of charge of the battery 4. This battery SOC information is used for the control of the motor/generator MG, and also is sent to the integrated controller 10 through the CAN communication line 11.

The first clutch controller 5 inputs sensor information from a first clutch stroke sensor 15 that detects a stroke position of the piston 14a of the hydraulic actuator 14 and a target CL1 torque command from the integrated controller 10, also inputs the other information. Then the first clutch controller 5 outputs a command that controls the engagement/slip-engagement/disengagement of the first clutch CL1 to the first clutch hydraulic unit 6 in the AT hydraulic control valve unit CVU.

The AT controller 7 inputs information from an accelerator opening sensor 16, a vehicle speed sensor 17 and other sensors 18. Then, during the travel with a D-range selected, the AT controller 7 searches an optimum speed range (optimum speed stage) according to a position on a shift map, of the operating point determined by an accelerator opening APO and a vehicle speed VSP, and also outputs a control command that achieves the searched speed range to the AT hydraulic control valve unit CVU. Here, the shift map is a map where an up-shift line and a down-shift line are drawn according to the accelerator opening and the vehicle speed.

In addition to the automatic transmission control by the AT controller 7, when inputting a target CL2 torque command from the integrated controller 10, the AT controller 7 executes a second clutch control in which a command that controls the slip-engagement of the second clutch CL2 is outputted to the second clutch hydraulic unit 8 in the AT hydraulic control valve unit CVU. Moreover, when a shift control command is outputted from the integrated controller 10, this shift control takes precedence over the normal transmission control by the AT controller 7, and the shift control according to the shift control command from the integrated controller 10 is executed.

The brake controller 9 inputs sensor information from a wheel speed sensor 19 for detecting each wheel speed of four wheels and a brake stroke sensor 20 and a regenerative coordination control command from the integrated controller 10, also inputs the other information. Then, for instance, in a case where the brake is applied by only a regenerative braking force upon a brake operation by brake pedal depression, when the braking force is lacking for a required braking force according to a brake stroke BS of the brake pedal depression, the brake controller 9 performs a regenerative coordination brake control so that the shortage of the braking force is compensated by a mechanical braking force (a hydraulic braking force or a motor braking force).

The integrated controller 10 is a controller that controls a consumption energy of the whole vehicle, and in order for the hybrid vehicle to travel at a maximum efficiency, the integrated controller 10 performs the operation. The integrated controller 10 inputs information from a motor revolution speed sensor 21 for detecting the motor revolution speed Nm and other sensors/switches 22, also inputs the other information through the CAN communication line 11. Then the integrated controller 10 outputs the target engine torque command to the engine controller 1, outputs the target MG torque command and the target MG revolution speed command to the motor controller 2, outputs the target CL1 torque command to the first clutch controller 5, outputs the target CL2 torque command to the AT controller 7, and outputs the regenerative coordination control command to the brake controller 9.

Figure 2:
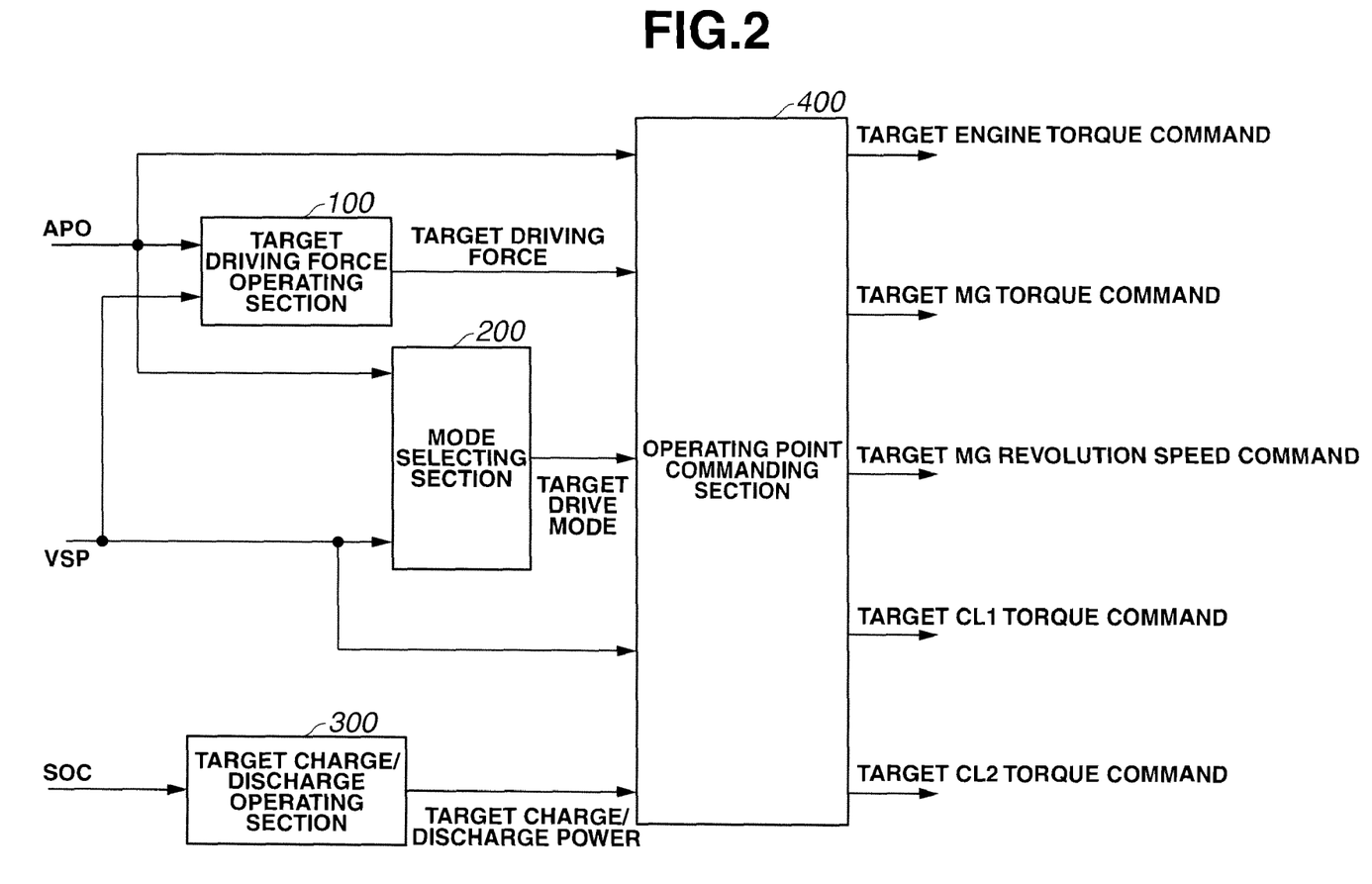
FIG. 2 is a control block diagram showing an operation process executed in an integrated controller 10 in the FR hybrid vehicle employing the control apparatus of the embodiment 1.
Figure 3:
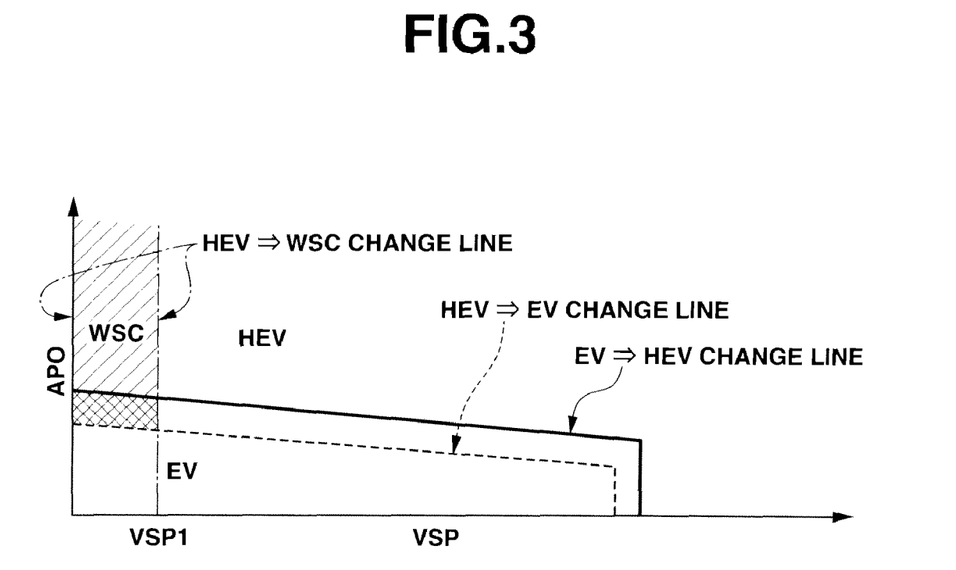
FIG. 3 is an EV-HEV selection map used when performing a mode selection operation in the integrated controller 10 in the FR hybrid vehicle employing the control apparatus of the embodiment 1.
Figure 4:
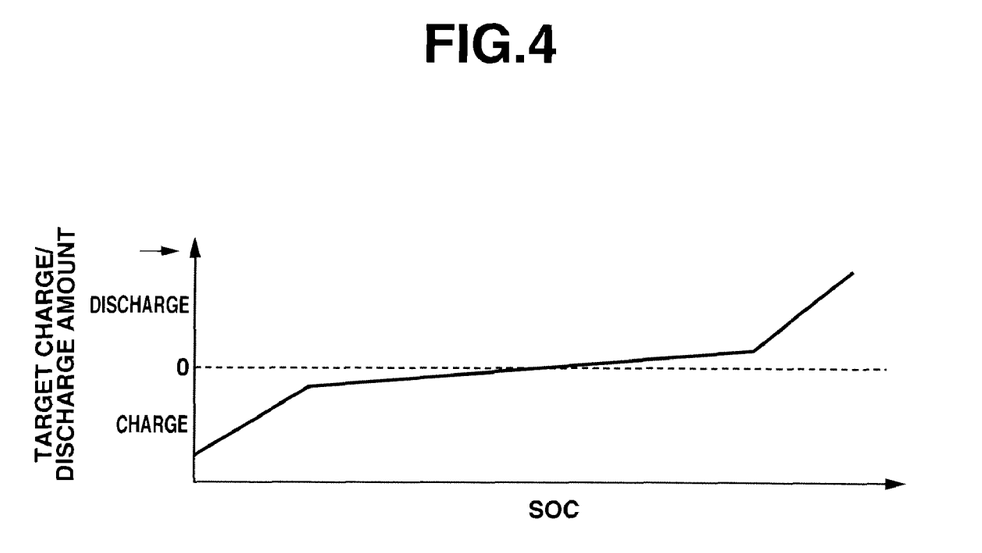
FIG. 4 is a target charge/discharge amount map used when performing a battery charge control in the integrated controller 10 in the FR hybrid vehicle employing the control apparatus of the embodiment 1.

FIG. 2 is a control block diagram showing an operation process executed in the integrated controller 10 in the FR hybrid vehicle employing the control apparatus of the embodiment 1. FIG. 3 is an EV-HEV selection map used when performing a mode selection operation in the integrated controller 10 in the FR hybrid vehicle employing the control apparatus of the embodiment 1. FIG. 4 is a target charge/discharge amount map used when performing a battery charge control in the integrated controller 10 in the FR hybrid vehicle employing the control apparatus of the embodiment 1.

In the following description, the operation process executed in the integrated controller 10 will be explained with reference to FIGS. 2 to 4.

As shown in FIG. 2, the integrated controller 10 has a target driving force operating section 100, a mode selecting section 200 (a drive mode change section or means), a target charge/discharge operating section 300, and an operating point commanding section 400.

The target driving force operating section 100 calculates a target driving force tFo0 on the basis of the accelerator opening APO and the vehicle speed VSP using a target driving force map.

The mode selecting section 200 selects the EV drive mode or the HEV drive mode as the target drive mode from the accelerator opening APO and the vehicle speed VSP using the EV-HEV selection map (a map) shown in FIG. 3. However, if the battery SOC is lower than or equal to a predetermined value, the target drive mode is set to the HEV drive mode compulsorily or forcibly. As seen in the EV-HEV selection map, HEV→WSC change lines are set at both positions of "VSP=0" and "VSP=VSP1" in the map. In the case of the vehicle start by the selection of the HEV drive mode, a lower vehicle speed area from the vehicle start until the vehicle speed VSP reaches a first setting vehicle speed VSP1 is set to the WSC drive mode. In the case of a deceleration vehicle stop by the selection of the HEV drive mode, when the vehicle speed VSP becomes the first setting vehicle speed VSP1 or less, the drive mode changes to the WSC drive mode. The first setting vehicle speed VSP1 used for this WSC change line is set to a vehicle speed at which the engine Eng maintains the idle rotation speed when the shift position of the automatic transmission AT is $1^{st}$ speed.

The target charge/discharge operating section 300 calculates a target charge/discharge power tP from the battery SOC using a target charge/discharge amount map shown in FIG. 4.

The operating point commanding section 400 calculates the target engine torque, the target MG torque, the target MG revolution speed, the target CL1 torque and the target CL2 torque, as an operating point attainment target, on the basis of input information such as the accelerator opening APO, the target driving force tFo0, the target drive mode, the vehicle speed VSP and the target charge/discharge power tP. Then the operating point commanding section 400 outputs the target engine torque command, the target MG torque command and the target MG revolution speed command, the target CL1 torque command, the target CL2 torque command to the controllers 1, 2, 5 and 7 respectively through the CAN communication line 11.

Figure 5:
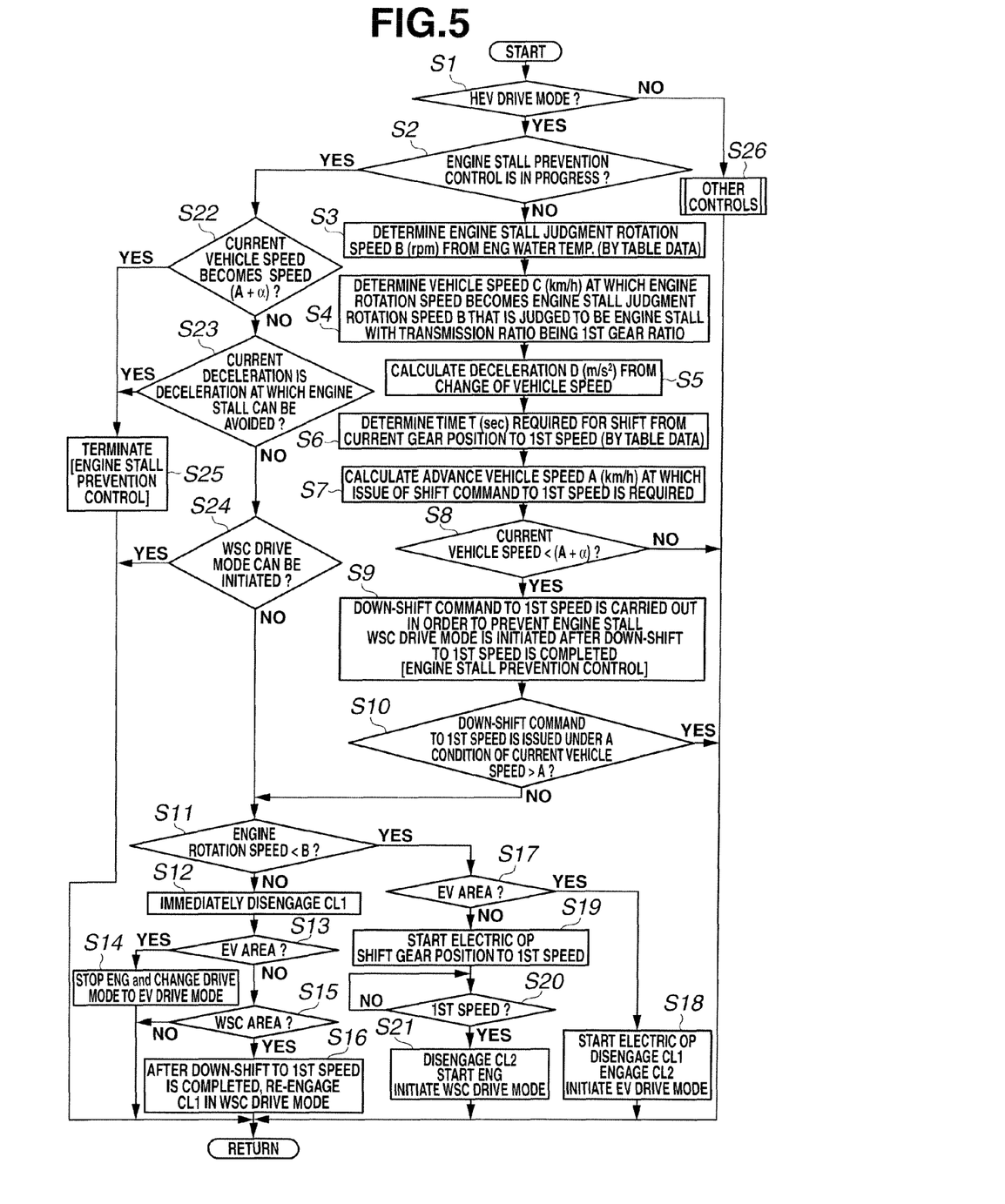
FIG. 5 is a flow chart showing flows of an engine stall prevention control operation and an engine stall avoidance control operation when HEV drive mode is selected, executed in the integrated controller 10 of the embodiment 1.
Figure 6A:
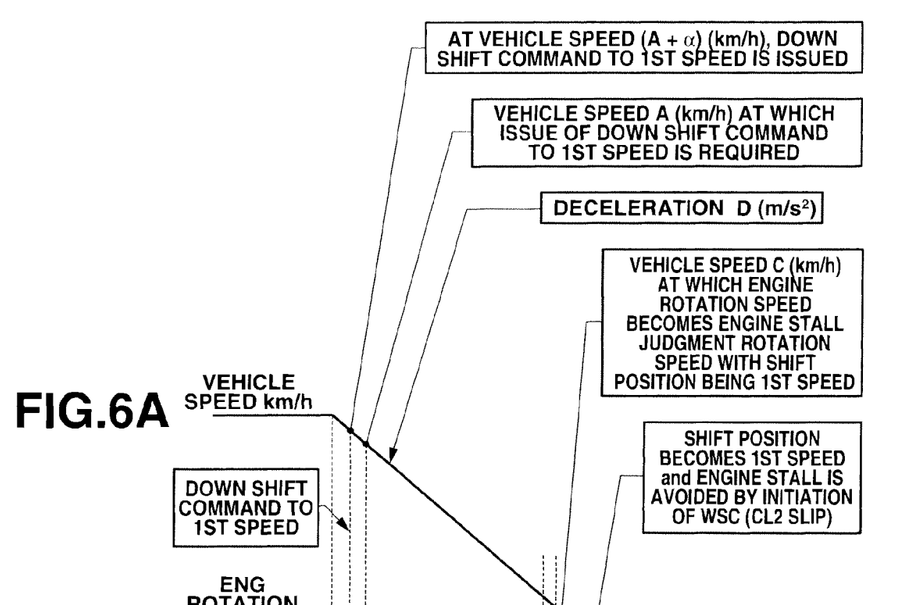
FIGS. 6A~6F are time charts showing each characteristic of a vehicle speed, an engine rotation speed, a target gear, an actual gear, a first clutch state and a second clutch state, for explaining an engine stall prevention operation based on a prediction judgment of avoidance of the occurrence of the engine stall upon an abrupt deceleration, of the FR hybrid vehicle employing the control apparatus of the embodiment 1.
Figures 6B, 6C:
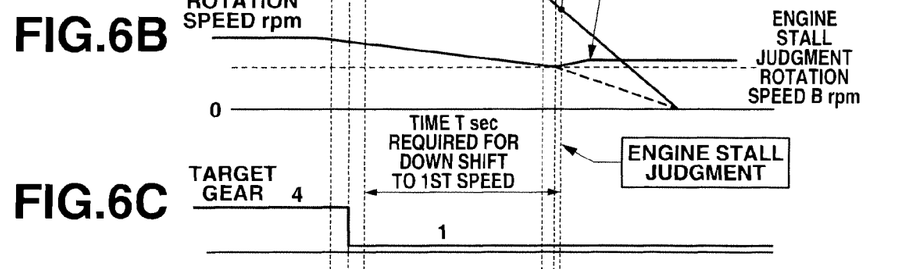
Figure 6D:
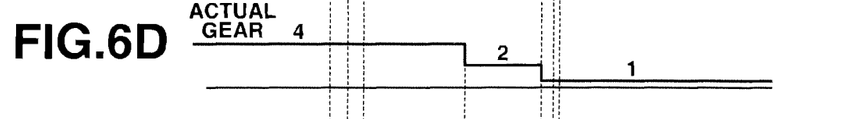
Figure 6E:
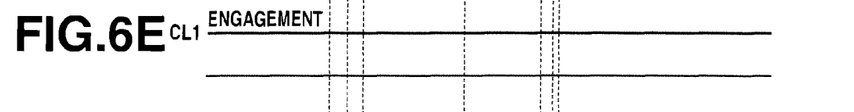
Figure 6F:
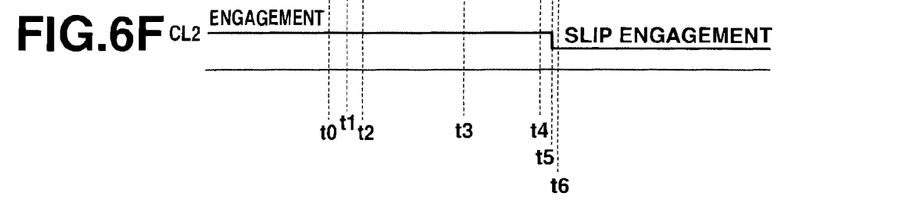
Figure 7A:
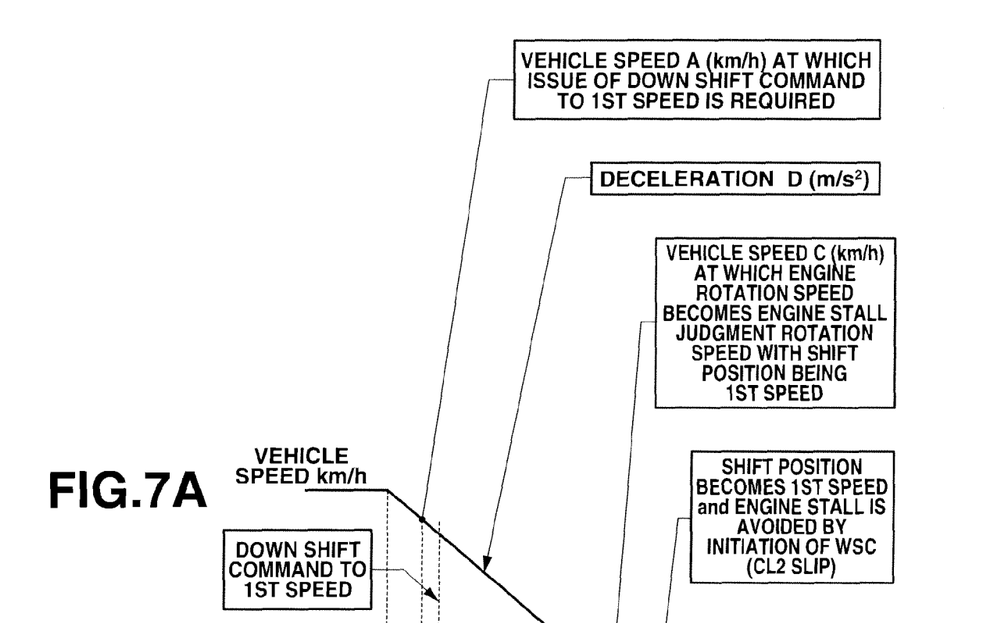
FIGS. 7A~7F are time charts showing each characteristic of a vehicle speed, an engine rotation speed, a target gear, an actual gear, a first clutch state and a second clutch state, for explaining an engine stall avoidance operation based on a prediction judgment of presence of a possibility of the engine stall occurrence upon an abrupt deceleration, of the FR hybrid vehicle employing the control apparatus of the embodiment 1.
Figure 7B:
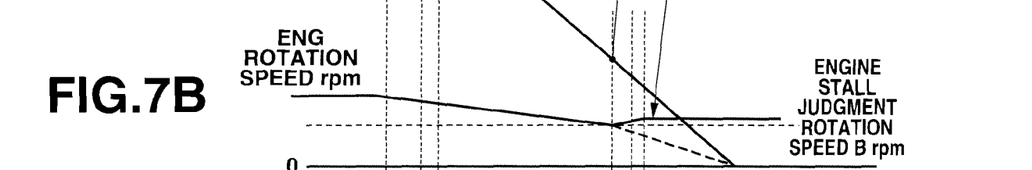
Figure 7C:
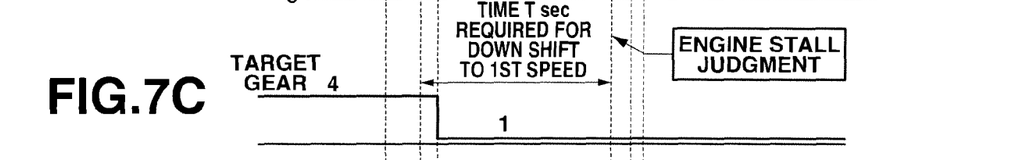
Figure 7D:
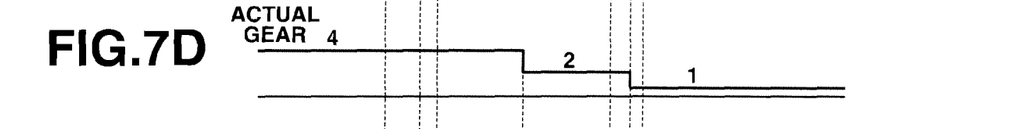
Figure 7E:
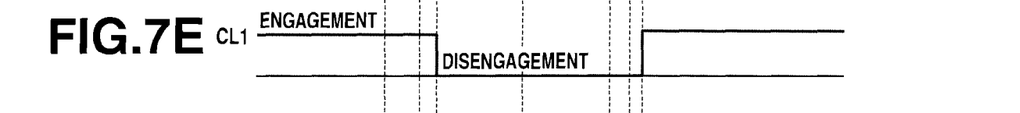
Figure 7F:
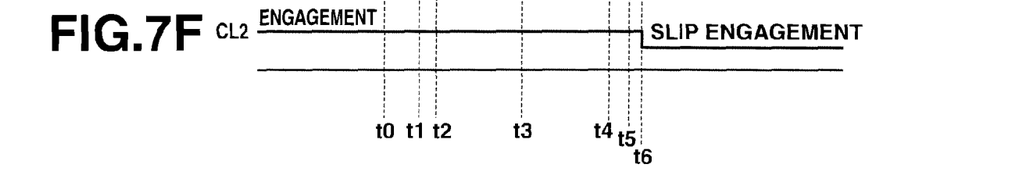

FIG. 5 is a flow chart (a deceleration detection section or means, an engine stall prevention control section or means, an engine stall prediction section or means, and an engine stall avoidance control section or means) showing flows of an engine stall prevention control operation and an engine stall avoidance control operation when the HEV drive mode is selected, executed in the integrated controller 10 of the embodiment 1. In the following description, each step of the flow chart will be explained.

In FIG. 5, at step S1, a judgment is made as to whether or not a current drive mode is the HEV drive mode (whether or not the HEV drive mode is selected). If YES (the HEV drive mode is selected), the routine proceeds to step S2. If NO (the drive mode except the HEV drive mode is selected), the routine proceeds to step S26.

At step S2, after judging that the HEV drive mode is selected at step S1, a judgment is made as to whether or not the engine stall prevention control is executed (whether or not the engine stall prevention control is in progress). If YES (the engine stall prevention control is in progress), the routine proceeds to step S22. If NO (the engine stall prevention control is in a stop state), the routine proceeds to step S3.

At step S3, after judging that the engine stall prevention control is in the stop state at step S2, an engine stall judgment rotation speed B (rpm) of an engine rotation speed which is judged to be the engine stall with a transmission ratio being $1^{st}$ gear ratio, is determined by table data produced on the basis of an engine cooling water temperature etc., and the routine proceeds to step S4.

At step S4, after the calculation of the engine stall judgment rotation speed B at step S3, a vehicle speed C (km/h) at which the engine rotation speed becomes the engine stall judgment rotation speed B that is judged to be the engine stall with the transmission ratio being $1^{st}$ gear ratio, is calculated by the following expression $$C \text{ (km/h)} = (B \text{ (rpm)}/1^{st} \text{ gear ratio}) \times (60/1000),$$

and the routine proceeds to step S5.

At step S5 (the deceleration detection section or means), after the calculation of the vehicle speed C at step S4, a deceleration D (m/s$^2$) is calculated by a change of the vehicle speed from the vehicle speed sensor 17, and the routine proceeds to step S6.

At step S6, after the calculation of the deceleration D at step S5, a shift required-time T (sec) required to shift a current gear position to $1^{st}$ speed is determined by table data, and the routine proceeds to step S7.

At step S7, after the calculation of the shift required-time T at step S6, an advance vehicle speed (a pre-vehicle speed or an anticipated vehicle speed) A (km/h) at which issue of a shift command to $1^{st}$ speed is required, is calculated by the following expression $$A \text{ (km/h)} = C \text{ (km/h)} + D \text{ (m/s}^2\text{)} \times T \text{ (sec)} \times 60 \times 60/1000,$$

and the routine proceeds to step S8.

At step S8, after the calculation of the advance vehicle speed A at step S7, a judgment is made as to whether or not a current vehicle speed is less than (A+α) that is a speed set by adding a setting vehicle speed α (km/h) to the advance vehicle speed A (km/h). If YES (the current vehicle speed<(A+α)), the routine proceeds to step S9. If NO (the current vehicle speed≧(A+α)), the routine proceeds to RETURN.

At step S9 (the engine stall prevention control section or means), after judging that the current vehicle speed<(A+α) at step S8, the engine stall prevention control is executed. In the engine stall prevention control, in order to prevent the engine stall, a down-shift command to $1^{st}$ speed is carried out, and after checking the down-shift to $1^{st}$ speed, the WSC drive mode in which the slip-engagement of the second clutch CL2 is performed is initiated. Subsequently, the routine proceeds to step S10.

At step S10 (the engine stall prediction section or means), after the execution of the engine stall prevention control at step S9, a judgment is made as to whether or not the down-shift command to $1^{st}$ speed was issued under a condition in which the current vehicle speed exceeds the advance vehicle speed A (km/h). If YES (the down-shift command to $1^{st}$ speed was outputted before the current vehicle speed becomes the advance vehicle speed A), the routine proceeds to RETURN. If NO (the down-shift command to $1^{st}$ speed was not outputted before the current vehicle speed becomes the advance vehicle speed A), the routine proceeds to step S11.

At step S11 (the engine stall prediction section or means), after judging that the down-shift command to $1^{st}$ speed was not outputted before the current vehicle speed becomes the advance vehicle speed A at step S10 or the WSC drive mode was not able to be initiated at step S24, a judgment is made as to whether or not the engine rotation speed becomes lower than the engine stall judgment rotation speed B. If YES (the engine rotation speed is lower than the engine stall judgment rotation speed B), the routine proceeds to step S17. If NO (the engine rotation speed is the engine stall judgment rotation speed B or higher), the routine proceeds to step S12.

At step S12, after judging that the engine rotation speed is the engine stall judgment rotation speed B or higher at step S11, in other words, judging that there is a possibility that the engine stall will occur (this means that although the engine rotation speed is the engine stall judgment rotation speed B or higher, the possibility of the engine stall still exists), the first clutch CL1 is immediately disengaged, and the routine proceeds to step S13.

At step S13, after the instant disengagement of the first clutch CL1 at step S12, a judgment is made as to whether or not the operating point determined by the accelerator opening APO and the vehicle speed VSP is in an EV area on the EV-HEV selection map, using a current accelerator opening APO, the current vehicle speed VSP and the EV-HEV selection map shown in FIG. 3. If YES (the operating point is in the EV area), the routine proceeds to step S14. If NO (the operating point is in areas except the EV area), the routine proceeds to step S15.

At step S14, after judging that the operating point is in the EV area at step S13, subsequently to the disengagement of the first clutch CL1, the engine Eng is stopped, and the drive mode is changed to the EV drive mode, then the routine proceeds to RETURN.

At step S15, after judging that the operating point is in the areas except the EV area at step S13, a judgment is made as to whether or not the operating point determined by the accelerator opening APO and the vehicle speed VSP is in a WSC area on the EV-HEV selection map, using the current accelerator opening APO, the current vehicle speed VSP and the EV-HEV selection map shown in FIG. 3. If YES (the operating point is in the WSC area), the routine proceeds to step S16. If NO (the operating point is in a HEV area), the routine proceeds to RETURN.

At step S16, after judging that the operating point is in the WSC area at step S15, the slip-engagement of the second clutch CL2 is performed after checking the down-shift to $1^{st}$ speed, and the first clutch CL1 that has been disengaged at step S12 is engaged again, then the routine proceeds to RETURN.

Here, regarding this re-engagement of the first clutch CL1, instead of the slip-engagement of the second clutch CL2, the engine rotation speed is synchronized with the motor revolution speed, then the first clutch CL1 could be engaged again at this synchronization timing.

In FIG. 5, step S12~step S16 correspond to the engine stall avoidance control section or means.

At step S17, after judging that the engine rotation speed is lower than the engine stall judgment rotation speed B at step S11, in other words, judging that the engine stall certainly occurs (in comparison with the case of the judgment of "the engine rotation speed is the engine stall judgment rotation speed B or higher" at step S11, the possibility of the occurrence of the engine stall is even higher), a judgment is made as to whether or not the operating point determined by the accelerator opening APO and the vehicle speed VSP is in the EV area on the EV-HEV selection map, using the current accelerator opening APO, the current vehicle speed VSP and the EV-HEV selection map shown in FIG. 3. If YES (the operating point is in the EV area), the routine proceeds to step S18. If NO (the operating point is in the areas except the EV area), the routine proceeds to step S19.

At step S18, after judging that the operating point is in the EV area at step S17, the sub-oil pump S-O/P (an electric oil pump) is started, and by disengaging the first clutch CL1 and engaging the second clutch CL2, the selection of the EV drive mode is initiated, then the routine proceeds to RETURN.

At step S19, after judging that the operating point is in the areas except the EV area at step S17, the sub-oil pump S-O/P (the electric oil pump) is started, and the shift command to $1^{st}$ speed is issued and the shift is performed, then the routine proceeds to step S20.

At step S20, after the command of the shift to $1^{st}$ speed at step S19, a judgment is made as to whether or not the shift position of the automatic transmission AT is $1^{st}$ speed. If YES (the shift to $1^{st}$ speed is completed), the routine proceeds to step S21. If NO (the shift to $1^{st}$ speed is in progress, i.e. the shift to $1^{st}$ speed is being carried out), the judgment at step S20 is repeated.

At step S21, after judging that the shift to $1^{st}$ speed is completed at step S20, the second clutch CL2 is disengaged, and after starting the engine Eng, the second clutch CL2 that has just been disengaged is slip-engaged, then the WSC drive mode is initiated. Subsequently, the routine proceeds to RETURN.

At step S22, after judging that the engine stall prevention control is in progress at step S2, a judgment is made as to whether or not the current vehicle speed becomes or returns to the speed (A+α) set by adding the setting vehicle speed α (km/h) to the advance vehicle speed A (km/h). If YES (the current vehicle speed≧(A+α)), the routine proceeds to step S25. If NO (the current vehicle speed<(A+α)), the routine proceeds to step S23.

At step S23, after judging that the current vehicle speed< (A+α) at step S22, a judgment is made as to whether or not a current deceleration is a deceleration at which the engine stall can be avoided. If YES (the current deceleration reaches the engine stall avoidance deceleration), the routine proceeds to step S25. If NO (the current deceleration does not reach the engine stall avoidance deceleration), the routine proceeds to step S24.

That is, at this step S23, by the current deceleration D and the shift required-time T required to return to $1^{st}$ speed from the current gear position, the advance vehicle speed A at which the issue of the shift command to $1^{st}$ speed is required is re-calculated, then the judgment as to whether the down-shift to $1^{st}$ speed is commanded in time or not is carried out again.

At step S24, after judging that the current deceleration does not reach the engine stall avoidance deceleration at step S23, a judgment is made as to whether or not the WSC drive mode was able to be initiated. If YES (the WSC drive mode was initiated), the routine proceeds to RETURN. If NO (the WSC drive mode was not initiated), the routine proceeds to step S11.

At step S25, after judging that the current vehicle speed≧ (A+α) at step S22 or the current deceleration reaches the engine stall avoidance deceleration at step S23, the engine stall prevention control is terminated, then the routine proceeds to RETURN. That is, step S22 and step S23 are termination conditions of the engine stall prevention control. When either one of these conditions is satisfied, the engine stall prevention control is terminated.

At step S26, after judging that the drive mode except the HEV drive mode is selected at step S1, other controls such as the EV drive mode selection control, the WSC drive mode selection control, the mode change control are carried out, then the routine proceeds to RETURN.

Next, operation of the present invention will be explained.

The operation by the control apparatus of the FR hybrid vehicle of the embodiment 1 will be explained, in order of the engine stall prevention control operation, the engine stall prediction operation, the engine stall avoidance control operation, the engine stall occurrence-determined control operation (the control operation when judging that the engine stall certainly occurs), an engine stall prevention operation based on a prediction judgment of avoidance of the occurrence of the engine stall upon an abrupt deceleration, and an engine stall avoidance operation based on a prediction judgment of presence of a possibility of the engine stall occurrence upon an abrupt deceleration.

[Engine Stall Prevention Control Operation]

In the flow chart in FIG. 5, when the HEV drive mode is selected also the engine stall prevention control is not executed, the routine proceeds to steps S1→S2→S3→S4→S5→S6 S7→S8. And, as long as "the current vehicle speed≧(A+α)" is judged at step S8, the flow of steps S1→S2→S3→S4→S5→S6→S7→S8 is repeated. In this flow, at step S3, the engine stall judgment rotation speed B that is the engine rotation speed which is judged to be the engine stall with the transmission ratio being $1^{st}$ gear ratio (a lowest transmission ratio), is determined. At step S4, the vehicle speed C at which the engine rotation speed becomes the engine stall judgment rotation speed B is calculated. At step S5, the deceleration D is calculated. At step S6, the shift required-time T required for the shift to $1^{st}$ speed from a current transmission ratio (the current gear position) is determined. At the next step S7, the advance vehicle speed A at which the issue of the shift command to $1^{st}$ speed is required is calculated using the shift required-time T, the vehicle speed C at which the engine rotation speed becomes the engine stall judgment rotation speed B and the deceleration D.

Further, at step S8, when judging that the current vehicle speed<(A+α), the routine proceeds to step S9 from step S8. At step S9, the engine stall prevention control is initiated. In the engine stall prevention control, in order to prevent the engine stall, the down-shift command to $1^{st}$ speed is carried out, and after checking the down-shift to $1^{st}$ speed, the WSC drive mode in which the slip-engagement of the second clutch CL2 is performed is initiated. At the next step S10, when judging that the down-shift command to $1^{st}$ speed was outputted before the current vehicle speed becomes the advance vehicle speed A, it is judged that the engine stall will not occur. Then on the basis of this engine stall occurrence avoidance judgment, the routine proceeds from step S10 to step S1→step S2. Further, the routine proceeds to steps S22, S23 which judge the control termination conditions. Unless at least one of the control termination conditions is satisfied, the engine stall prevention control is maintained.

At step S22 that judges the control termination condition, when judging that the current vehicle speed is a higher than the advance vehicle speed A, it is judged that there is no fear of the engine stall, and the routine proceeds to step S25, then the engine stall prevention control is terminated.

At step S23 that judges the control termination condition, when judging that the current deceleration becomes the deceleration at which the engine stall can be avoided, it is judged that there is no fear of the engine stall, and the routine proceeds to step S25, then the engine stall prevention control is terminated.

Here, since this step S23 is a step which judges that the current deceleration is not the abrupt deceleration, this is carried out by judging that the calculated deceleration D becomes a no-braking-equivalent deceleration or by a judgment of a brake-OFF operation etc.

At step S24, when judging that the WSC drive mode was able to be initiated, it is judged that there is no fear of the engine stall, and the routine proceeds to RETURN, and the engine stall prevention control is maintained.

Here, the initiation judgment of the WSC drive mode is made by an occurrence of an input/output difference rotation of the second clutch CL2 or a lapse of a predetermined time from the command of the WSC drive mode etc.

As described above, in the engine stall prevention control of the embodiment 1, the engine stall judgment rotation speed B that is the engine rotation speed which is judged to be the engine stall with the transmission ratio being $1^{st}$ gear ratio, the shift required-time T required for the shift to $1^{st}$ speed from the current transmission ratio and the vehicle speed C at which the engine rotation speed becomes the engine stall judgment rotation speed B are determined. Also the advance vehicle speed A at which the issue of the shift command to $1^{st}$ speed is required is calculated using the shift required-time T, the vehicle speed C at which the engine rotation speed becomes the engine stall judgment rotation speed B and the deceleration D. And when the current vehicle speed reaches the speed (A+α) set by adding the setting vehicle speed α to the advance vehicle speed A, a coast-down shift that changes the shift position of the automatic transmission AT to $1^{st}$ speed is performed, then upon the completion of the down-shift to $1^{st}$ speed, the WSC drive mode in which the slip-engagement of the second clutch CL2 is performed is initiated.

Accordingly, in the case of such deceleration that the down-shift command to $1^{st}$ speed is outputted before the current vehicle speed decreases to the advance vehicle speed A, by the coast-down shift that changes the shift position of the automatic transmission AT to $1^{st}$ speed, the engine rotation speed is increased or built up so as not to fall below the idle rotation speed. And when down-shifted to $1^{st}$ speed, by slip-engaging the second clutch CL2, a difference rotation between the engine Eng arranged at an input side of the second clutch CL2 and the left and right driving wheels RL, RR arranged at an output side of the second clutch CL2 is tolerated or absorbed. As a consequence, in a case of a gentle deceleration with the HEV drive mode selected, the engine stall can be avoided while maintaining the engagement of the first clutch CL1.

[Engine Stall Prediction Operation]

With respect to the engine stall prediction in the embodiment 1, at step S10 in FIG. 5, "avoidance of the occurrence of the engine stall" or "presence of the occurrence of the engine stall" is predicted. Further, at step S11, "the engine stall certainly occurs" or "there is a possibility that the engine stall will occur" is predicted.

That is to say, at step S10, when the coast-down shift command to $1^{st}$ speed is outputted at the time at which the current vehicle speed exceeds the advance vehicle speed A, "avoidance of the occurrence of the engine stall" is predicted, and the engine stall prevention control is carried out.

On the other hand, when the coast-down shift command to $1^{st}$ speed is not outputted at the time at which the current vehicle speed exceeds the advance vehicle speed A, "presence of the occurrence of the engine stall" is predicted. Then, further, the routine proceeds to step S11 where "the engine stall certainly occurs" and "there is a possibility that the engine stall will occur" are distinguished.

In the case where "presence of the occurrence of the engine stall" is predicted at step S10 or the termination conditions of the engine stall prevention control are not satisfied at step S24, at step S11, when the engine rotation speed is lower than the engine stall judgment rotation speed B before the initiation of the WSC drive mode, it is predicted that the engine stall certainly occurs, then a recovery control from the engine stall of steps S17~S21 is performed.

On the other hand, when the engine rotation speed is not lower than the engine stall judgment rotation speed B before the initiation of the WSC drive mode at step S11, it is predicted that there is a possibility that the engine stall will occur, then the engine stall avoidance control of steps S12~S16 is performed.

As explained above, in the engine stall prediction of the embodiment 1, at step S10, if the coast-down shift command changing the shift position of the automatic transmission AT to $1^{st}$ speed is outputted at the time at which the current vehicle speed exceeds the advance vehicle speed A, it is predicted that the occurrence of the engine stall is avoided. That is, since the prediction at step S10 is made by the judgment using the advance vehicle speed A at which the issue of the shift command to $1^{st}$ speed is required, it can be judged that, the down-shift to $1^{st}$ speed is carried out before the engine rotation speed becomes the engine stall judgment rotation speed B or less, and by the down-shift to $1^{st}$ speed, the engine rotation speed is increased or built up so as not to fall below the idle rotation speed.

In addition, in the engine stall prediction of the embodiment 1, at step S11, if the engine rotation speed is lower than the engine stall judgment rotation speed B before the initiation of the WSC drive mode, it is predicted that the engine stall certainly occurs. That is, since the prediction at step S11 is made by the judgment using the engine stall judgment rotation speed B of the engine rotation speed, it can be judged that, when the engine rotation speed is lower than the engine stall judgment rotation speed B before the initiation of the WSC drive mode that absorbs the rotation difference, the engine stall certainly occurs.

Further, in the engine stall prediction of the embodiment 1, when the coast-down shift command to $1^{st}$ speed is not outputted at the time at which the current vehicle speed exceeds the advance vehicle speed A at step S10 but the engine rotation speed is not lower than the engine stall judgment rotation speed B before the initiation of the WSC drive mode at step S11, it is predicted that there is a possibility that the engine stall will occur. That is, in a case where the vehicle condition (the vehicle speed, the engine rotation speed) is in an area where the judgment of the presence/absence of the engine stall cannot be clearly judged by the judgment using the advance vehicle speed A and the judgment using the engine stall judgment rotation speed B, a probability of the engine stall may be low or may be high. However, in any case, it can be judged that the possibility of occurrence of the engine stall exists.

[Engine Stall Avoidance Control Operation]

At step S11 in FIG. 5, when the engine rotation speed is not lower than the engine stall judgment rotation speed B before the initiation of the WSC drive mode also the possibility of the occurrence of the engine stall is predicted, the routine proceeds to step S12 from step S11. And at step S12, the first clutch CL1 is immediately disengaged.

Accordingly, by performing a pre-control that disengages the first clutch CL1 at the time at which the possibility of the occurrence of the engine stall is predicted, the engine Eng is disconnected from the elements of the driveline from the motor/generator MG to the left and right driving wheels RL, RR, which is a load for the engine Eng. The occurrence of the engine stall can be therefore avoided.

Further, in the case where the operating point is in the area of the EV drive mode at the time at which the first clutch CL1 is disengaged, the routine proceeds to step S13→step S14→RETURN from step S12. And at step S14, by stopping the engine Eng, the EV drive mode is selected.

Furthermore, in the case where the operating point is not in the area of the WSC drive mode at the time at which the first clutch CL1 is disengaged, the routine proceeds to step S13→step S15→RETURN from step S12. Then a state in which the first clutch CL1 is disengaged and the engine Eng remains working is maintained.

On the other hand, in the case where the operating point is in the area of the WSC drive mode at the time at which the first clutch CL1 is disengaged, the routine proceeds to step S13→step S15→step S16→RETURN from step S12. At step S16, after the down-shift to 1$^{st}$ speed, the second clutch CL2 is slip-engaged, and the first clutch CL1 that has been disengaged at step S12 is engaged again with the second clutch CL2 slip-engaged.

Consequently, a torque change due to the re-engagement of the first clutch CL1 is absorbed by the slip-engagement of the second clutch CL2, thereby returning to the WSC drive mode while preventing an occurrence of a re-engagement shock of the first clutch CL1.

Here, when returning to the WSC drive mode after the down-shift to 1$^{st}$ speed, the first clutch CL1 could be re-engaged after the engine rotation speed and the motor revolution speed are synchronized. In this case, the torque change due to the re-engagement of the first clutch CL1 is absorbed by this synchronized rotation engagement. Thus the mode can be returned to the WSC drive mode while preventing the occurrence of the re-engagement shock of the first clutch CL1.

[Engine Stall Occurrence-Determined Control Operation (Control Operation when Judging that Engine Stall Certainly Occurs)]

At step S11 in FIG. 5, when the engine rotation speed is already lower than the engine stall judgment rotation speed B before the initiation of the WSC drive mode then the engine stall certainly occurs, the routine proceeds to step S17 from step S11. And at step S17, when judging that the operating point is in the area of the EV drive mode, the routine proceeds to step S18→RETURN from step S17. At step S18, the sub-oil pump S-O/P (the electric oil pump) is started, and by disengaging the first clutch CL1 and engaging the second clutch CL2, the selection of the EV drive mode is initiated.

On the other hand, at step S17, when judging that the operating point is in the area except the EV drive mode, the routine proceeds to step S19→step S20 from step S17. At step S19, the sub-oil pump S-O/P (the electric oil pump) is started, and the shift command to 1$^{st}$ speed is issued and the shift is performed. At step S20, the judgment is made as to whether or not the shift position of the automatic transmission AT is 1$^{st}$ speed. When judging that the shift position of the automatic transmission AT becomes 1$^{st}$ speed at step S20, the routine proceeds to step S21→RETURN. At step S21, the second clutch CL2 is disengaged, and after starting the engine Eng, the second clutch CL2 that has just been disengaged is slip-engaged, then the WSC drive mode is initiated.

Accordingly, when the occurrence of the engine stall is determined (i.e. when judging that the engine stall certainly occurs) also the operating point is in the area of the EV drive mode, by the start of the sub-oil pump S-O/P that secures a required oil pressure and the disengagement of the first clutch CL1 also the engagement of the second clutch CL2, the shift to the EV drive mode can be smoothly achieved.

Additionally, when the occurrence of the engine stall is determined (i.e. when judging that the engine stall certainly occurs) also the operating point is in the area except the EV drive mode, by the start of the sub-oil pump S-O/P and the issue of the shift command to 1$^{st}$ speed also by the disengagement of the second clutch CL2, the start of the engine Eng and the slip-engagement of the second clutch CL2 after the down-shift to 1$^{st}$ speed, the shift to the WSC drive mode can be smoothly achieved.

[Engine Stall Prevention Operation Based on Prediction Judgment of Avoidance of Occurrence of Engine Stall Upon Abrupt Deceleration]

FIGS. 6A~6F are time charts showing each characteristic of the vehicle speed, the engine rotation speed, a target gear, an actual gear, a first clutch state and a second clutch state, for explaining an engine stall prevention operation based on a prediction judgment of avoidance of the engine stall occurrence upon an abrupt deceleration, of the FR hybrid vehicle employing the control apparatus of the embodiment 1.

In the following description, the engine stall avoidance operation when the prediction judgment of the avoidance of the engine stall occurrence is made upon the abrupt deceleration will be explained with reference to FIGS. 6A~6F.

As shown in FIGS. 6A~6F, the vehicle state changes from a constant speed travel state to a deceleration travel at time t0, and the down-shift command to 1$^{st}$ speed is issued at time t1 at which the current vehicle speed becomes the speed (A+α) (the advance vehicle speed A+the setting vehicle speed α). In this case, by the fact that the down-shift command to 1$^{st}$ speed is issued before the current vehicle speed becomes the advance vehicle speed A (i.e. the current vehicle speed>A), "YES" at step S10 in FIG. 5 is judged, and the engine stall prevention control (step S9) based on the prediction judgment of avoidance of the engine stall occurrence upon the abrupt deceleration is carried out.

Thus, the down-shift command to 1$^{st}$ speed is issued at time t1, the vehicle speed becomes the advance vehicle speed A at time t2, and the actual gear is down-shifted from 4$^{th}$ speed to 2$^{nd}$ speed at time t3, further the actual gear is down-shifted from 2$^{nd}$ speed to 1$^{st}$ speed at time t4.

When down-shifted to 1$^{st}$ speed at time t4, the slip-engagement of the second clutch CL2 is initiated at time t5 just after the down-shift to 1$^{st}$ speed. Regarding this slip-engagement initiation time t5, by the fact that the down-shift command to 1$^{st}$ speed is issued at time t1 before time t2 at which the current vehicle speed becomes the advance vehicle speed A, a timing of the slip-engagement initiation (t5) is earlier than time t6 that is time by adding the shift required-time T required for the down-shift to 1$^{st}$ speed from t2 of the advance vehicle speed A to time t2 (time t6=time at which the engine rotation speed becomes the engine stall judgment rotation speed B).

Therefore, with this engine stall prevention control, when the actual gear becomes 1$^{st}$ speed at time t4 and the slip-engagement of the second clutch CL2 is initiated at time t5, the difference rotation is tolerated or absorbed by the slip of the second clutch CL2. Then, despite the abrupt deceleration, the engine rotation speed is maintained at a rotation speed by which the engine rotation speed does not fall below the engine stall judgment rotation speed B, the engine stall can be therefore avoided.

[Engine Stall Avoidance Operation Based on Prediction Judgment of Presence of Possibility of Engine Stall Occurrence Upon Abrupt Deceleration]

FIGS. 7A~7F are time charts showing each characteristic of a vehicle speed, an engine rotation speed, a target gear, an actual gear, a first clutch state and a second clutch state, for explaining an engine stall avoidance operation based on a prediction judgment of presence of the possibility of the engine stall occurrence upon the abrupt deceleration, of the FR hybrid vehicle employing the control apparatus of the embodiment 1.

In the following description, the engine stall avoidance operation when the prediction judgment of the presence of the possibility of the engine stall occurrence is made upon the abrupt deceleration will be explained with reference to FIGS. 7A~7F.

As shown in FIGS. 7A~7F, the vehicle state changes from a constant speed travel state to a deceleration travel at time t0, and the down-shift command to 1$^{st}$ speed is issued at time t2 that is later than time t1 at which the current vehicle speed becomes the advance vehicle speed A. In this case, by the fact that the down-shift command to 1$^{st}$ speed is issued after the current vehicle speed becomes the advance vehicle speed A (i.e. the current vehicle speed<A), "NO" at step S10 in FIG. 5 is judged. Further, since the engine rotation speed at time t1 at which the current vehicle speed becomes the advance vehicle speed A exceeds the engine stall judgment rotation speed B, "NO" at step S11 in FIG. 5 is judged. By these judgments, the engine stall avoidance control (steps S12~S16) based on the prediction judgment of presence of the possibility of the engine stall occurrence upon the abrupt deceleration is carried out.

Thus, when the vehicle speed becomes the advance vehicle speed A at time t1 and the down-shift command to $1^{st}$ speed is issued at time t2, the first clutch CL1 is disengaged at time t2. And the actual gear is down-shifted from $4^{th}$ speed to $2^{nd}$ speed at time t3. Further, time t4 that is time by adding the shift required-time T required for the down-shift to $1^{st}$ speed from t1 at which the current vehicle speed becomes the advance vehicle speed A to time t1 elapses. However, since the first clutch CL1 is disengaged, the engine stall is avoided.

Furthermore, when the actual gear is down-shifted from $2^{nd}$ speed to $1^{st}$ speed at time t5, the slip-engagement of the second clutch CL2 is initiated and the first clutch CL1 that has been disengaged is engaged again at time t6 just after the down-shift to $1^{st}$ speed.

Therefore, with this engine stall avoidance control, by the fact that the first clutch CL1 is disengaged for a time period from time t2 to time t6, the engine Eng is disconnected from the elements of the driveline from the motor/generator MG to the left and right driving wheels RL, RR. Thus the engine Eng separately operates, thereby avoiding the engine stall.

Further, at time t6 at which the first dutch CL1 having been disengaged is re-engaged, the slip-engagement of the second clutch CL2 is simultaneously performed. Thus by a torque change absorbing action or effect by this slip of the second dutch CL2, the occurrence of the re-engagement shock of the first dutch CL1 can be prevented.

Next, effects of the present invention will be explained. The control apparatus of the FR hybrid vehicle in the embodiment 1 provides the following effects.

(1) The control apparatus of the hybrid vehicle, the hybrid vehicle having, the engine (the engine Eng), the motor (the motor/generator MG), the driving wheels (RL, RR), the automatic transmission AT arranged between the motor (MG) and the driving wheels (RL, RR), the first engagement element (the first clutch CL1) arranged between the engine Eng and the motor (MG) for connecting/disconnecting the engine Eng and the motor (MG), and the second engagement element (the second clutch CL2) arranged between the motor (MG) and the driving wheels (RL, RR) for connecting/disconnecting the motor (MG) and the driving wheels (RL, RR), the control apparatus comprises: the drive mode change section (the drive mode change section or means 200) that changes the following drive modes according to the vehicle travel state: the first drive mode (EV drive mode) in which the first engagement element (CL1) is disengaged and the second engagement element (CL2) is engaged then the vehicle travels by only the driving force of the motor (MG), the second drive mode (HEV drive mode) in which the first and second engagement elements (CL1, CL2) are respectively engaged then the vehicle travels by both driving forces of the engine Eng and the motor (MG), and the third drive mode (WSC drive mode) in which at least the second engagement element (CL2) is slip-engaged then the vehicle travels by the driving force transmitted through the second engagement element (CL2); the deceleration detection section (step S5 in FIG. 5) that detects the deceleration of the vehicle; the engine stall prevention control section (step S9) that performs the coast-down shift which changes the transmission ratio of the automatic transmission AT to the lower transmission ratio upon deceleration of the vehicle; the engine stall prediction section (steps S10, S11) that predicts whether or not the engine stall occurs, on the basis of the vehicle deceleration detected by the deceleration detection section (step S5) and the state of the coast-down shift by the engine stall prevention control section (step S9), during the travel in the second drive mode (HEV drive mode); and the engine stall avoidance control section (step S12) that disengages at least one of the first and second engagement elements (CL1, CL2) when the occurrence of the engine stall is predicted by the engine stall prediction section (steps S10, S11).

With this, upon the deceleration by the second drive mode (HEV drive mode), by the pre-control based on the accurate prediction of the occurrence of the engine stall, the occurrence of the engine stall can be avoided.

(2) The engine stall prevention control section (steps S3~S9) determines the engine stall judgment rotation speed B that is the engine rotation speed which is judged to be the engine stall with the transmission ratio being the lowest transmission ratio (step S3), the vehicle speed C at which the engine rotation speed becomes the engine stall judgment rotation speed B (step S4), and the shift required-time T required for shift from the current transmission ratio to the lowest transmission ratio (step S6), calculates the advance vehicle speed A at which issue of the shift command to the lowest transmission ratio is required, using the vehicle speed C at which the engine rotation speed becomes the engine stall judgment rotation speed B, the shift required-time T and the deceleration D (step S7), performs the coast-down shift that changes the transmission ratio of the automatic transmission AT to the lowest transmission ratio, when the current vehicle speed reaches the speed (A+α) that is set by adding the setting vehicle speed α to the advance vehicle speed A ("YES" at step S8), and initiates the third drive mode (WSC drive mode) in which the second engagement element (CL2) is slip-engaged, when down-shifted to the lowest transmission ratio.

With this, in addition to the effect of (1), in the case of such deceleration that the down-shift command to the lowest transmission ratio ($1^{st}$ speed) is outputted before the current vehicle speed decreases to the advance vehicle speed A, by the engine stall prevention control by the coast-down shift and the slip-engagement of the second engagement element (CL2), the occurrence of the engine stall can be surely prevented.

(3) The engine stall prediction section (steps S10) predicts avoidance of the occurrence of the engine stall ("YES" at step S10) when the coast-down shift command to the lowest transmission ratio ($1^{st}$ speed) is outputted at the time at which the current vehicle speed exceeds the advance vehicle speed A, and predicts presence of possibility of the engine stall occurrence ("NO" at step S10) when the coast-down shift command to the lowest transmission ratio ($1^{st}$ speed) is not outputted at the time at which the current vehicle speed exceeds the advance vehicle speed A.

With this, in addition to the effect of (2), by judgment as to whether the coast-down shift command is outputted before or after the vehicle speed becomes the advance vehicle speed A, the avoidance of the occurrence of the engine stall and the presence of possibility of the engine stall occurrence can be accurately distinguished.

(4) In the case where the presence of possibility of the engine stall occurrence is predicted ("NO" at step S10) by the engine stall prediction section (steps S10) also the engine rotation speed is not lower than the engine stall judgment rotation speed B ("NO" at step S11), the engine stall avoidance control section (steps S12~S13, S15~S16) disengages the first engagement element (CL1) (step S12), and slip-engages the second engagement element (CL2) and re-engages the first engagement element (CL1) (step S16), after waiting for the transmission ratio to change to the lowest transmission ratio.

With this, in addition to the effect of (3), although the presence of possibility of the engine stall occurrence is predicted, when the engine rotation speed is the engine stall judgment rotation speed B or higher, by disengaging the first engagement element (CL1), after avoiding the engine stall, the drive mode can be returned to the third drive mode (WSC drive mode) immediately while suppressing the occurrence of the re-engagement shock of the first engagement element (CL1) by the slip-engagement of the second engagement element (CL2).

(5) The control apparatus of the hybrid vehicle further comprises: the first oil pump (the mechanical oil pump M-O/P) driven by the driving force of at least one of the engine Eng and the motor (the motor/generator MG) and supplying the oil to the engagement elements (CL1, CL2) for control of the engagement/disengagement of the engagement elements (CL1, CL2) by the oil pressure; and the second oil pump (the sub-oil pump S-O/P) driven by the driving source except the engine Eng and the motor (the motor/generator MG) and supplying the oil to the engagement elements (CL1, CL2), and in the case where the presence of possibility of the engine stall occurrence is predicted ("NO" at step S10) by the engine stall prediction section (steps S10) also the engine rotation speed is lower than the engine stall judgment rotation speed B ("YES" at step S11), the engine stall avoidance control section (steps S17, S19~S21) starts the second oil pump (the sub-oil pump S-O/P), outputs the shift command to the lowest transmission ratio (step S19), judges whether or not the vehicle travel state is in the area of the first drive mode (EV drive mode) from the accelerator opening (APO) and the vehicle speed (VSP), when judging that the vehicle travel state is not in the area of the first drive mode (EV drive mode) ("NO" at step S17), after waiting for the transmission ratio to change to the lowest transmission ratio ("YES" at step 20), disengages the second engagement element (CL2), starts the engine Eng, and slip-engages the second engagement element (CL2) (step S21), for initiation of the vehicle travel in the third drive mode (WSC drive mode).

With this, in addition to the effect of (3), although the presence of possibility of the engine stall occurrence is predicted, when the engine rotation speed is lower than the engine stall judgment rotation speed B, as an insurance against the engine stall due to stop of production of the oil pressure by the first oil pump (the mechanical oil pump M-O/P), by driving the second oil pump (the sub-oil pump S-O/P), the oil pressure is secured. And by disengaging the first engagement element (CL1), after avoiding the engine stall, the drive mode can be returned to the third drive mode (WSC drive mode) immediately while suppressing the occurrence of the re-engagement shock of the first engagement element (CL1) by the synchronized rotation engagement.

Although the control apparatus of the hybrid vehicle according to the present invention has been explained on the basis of the embodiments 1, the present invention is not limited to the embodiment 1.

In the embodiment 1, when predicting the occurrence of the engine stall, the first clutch CL1 is disengaged (step S12). However, in a case where the WSC drive mode can be initiated with the second clutch CL2 slip-engaged at a speed except $1^{st}$ speed, the first clutch CL1 is not disengaged, but the slip-engagement of the second clutch CL2 could be initiated. That is, the present invention can be achieved as long as at least one of the first clutch CL1 and the second clutch CL2 is disengaged (or slip-engaged).

In the embodiment 1, although the present invention is applied to the hybrid vehicle in which the automatic transmission having multi-speeds is mounted, the present invention can be applied to a hybrid vehicle in which a CVT (continuously variable transmission) (a belt-drive CVT, a toroidal type CVT) is mounted.

In the embodiment 1, the control apparatus is applied for the FR hybrid vehicle. However, the control apparatus can also be applied for the FF hybrid vehicle. That is, as long as the hybrid vehicle has the engine, the first engagement element, the motor, the automatic transmission and driving wheels on the driveline from an upstream side and has the second engagement element between the motor and the automatic transmission or between the automatic transmission and the driving wheels or in the automatic transmission, the control apparatus can be applied for such vehicle.

The entire contents of Japanese Patent Application No. 2009-234936 filed on Oct. 9, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus of a hybrid vehicle, the hybrid vehicle having, an engine, a motor, driving wheels, an automatic transmission arranged between the motor and the driving wheels, a first engagement element arranged between the engine and the motor for
connecting/disconnecting the engine and the motor, and a second engagement element arranged between the motor and the driving wheels for connecting/disconnecting the motor and the driving wheels, the control apparatus comprising:
a drive mode change section that changes the following drive modes according to a vehicle travel state:
a first drive mode in which the first engagement element is disengaged and the second engagement element is engaged then the vehicle travels by only a driving force of the motor,
a second drive mode in which the first and second engagement elements are respectively engaged then the vehicle travels by both driving forces of the engine and the motor, and
a third drive mode in which at least the second engagement element is slip-engaged then the vehicle travels by a driving force transmitted through the second engagement element;
a deceleration detection section that detects a deceleration of the vehicle;
an engine stall prevention control section that performs a coast-down shift which changes a transmission ratio of the automatic transmission to a lower transmission ratio upon deceleration of the vehicle;
an engine stall prediction section that predicts whether or not an engine stall occurs, on the basis of the vehicle deceleration detected by the deceleration detection section and a state of the coast-down shift by the engine stall prevention control section, during a travel in the second drive mode; and an engine stall avoidance control section that disengages at least one of the first and second engagement elements when the occurrence of the engine stall is predicted by the engine stall prediction section.

2. The control apparatus of the hybrid vehicle as claimed in claim 1, wherein:
the engine stall prevention control section determines
an engine stall judgment rotation speed that is an engine rotation speed which is judged to be the engine stall with the transmission ratio being a lowest transmission ratio,
a vehicle speed at which the engine rotation speed becomes the engine stall judgment rotation speed, and
a shift required-time required for shift from a current transmission ratio to the lowest transmission ratio,
calculates an advance vehicle speed at which issue of a shift command to the lowest transmission ratio is required, using the vehicle speed at which the engine rotation speed becomes the engine stall judgment rotation speed, the shift required-time and the deceleration,
performs the coast-down shift that changes the transmission ratio of the automatic transmission to the lowest transmission ratio, when a current vehicle speed reaches a speed that is set by adding a setting vehicle speed to the advance vehicle speed, and
initiates the third drive mode in which the second engagement element is slip-engaged, when down-shifted to the lowest transmission ratio.

3. The control apparatus of the hybrid vehicle as claimed in claim 2, wherein:
the engine stall prediction section
predicts avoidance of the occurrence of the engine stall, when the coast-down shift command to the lowest transmission ratio is outputted at a time at which the current vehicle speed exceeds the advance vehicle speed, and
predicts presence of possibility of the engine stall occurrence, when the coast-down shift command to the lowest transmission ratio is not outputted at the time at which the current vehicle speed exceeds the advance vehicle speed.

4. The control apparatus of the hybrid vehicle as claimed in claim 3, wherein:
in a case where the presence of possibility of the engine stall occurrence is predicted by the engine stall prediction section also the engine rotation speed is not lower than the engine stall judgment rotation speed, the engine stall avoidance control section
disengages the first engagement element, and
slip-engages the second engagement element and re-engages the first engagement element, after waiting for the transmission ratio to change to the lowest transmission ratio.

5. The control apparatus of the hybrid vehicle as claimed in claim 3, further comprising:
a first oil pump driven by a driving force of at least one of the engine and the motor and supplying an oil to the engagement elements for control of the engagement/disengagement of the engagement elements by an oil pressure; and
a second oil pump driven by a driving source except the engine and the motor and supplying the oil to the engagement elements,
and wherein:
in a case where the presence of possibility of the engine stall occurrence is predicted by the engine stall prediction section also the engine rotation speed is lower than the engine stall judgment rotation speed, the engine stall avoidance control section
starts the second oil pump,
outputs the shift command to the lowest transmission ratio,
judges whether or not the vehicle travel state is in an area of the first drive mode from an accelerator opening and the vehicle speed,
when judging that the vehicle travel state is not in the area of the first drive mode, after waiting for the transmission ratio to change to the lowest transmission ratio, disengages the second engagement element,
starts the engine, and
slip-engages the second engagement element, for initiation of the vehicle travel in the third drive mode.

6. A method for controlling a hybrid vehicle, the hybrid vehicle having an engine, a motor, an automatic transmission, a first engagement element arranged between the engine and the motor for
connecting/disconnecting the engine and the motor, and a second engagement element arranged on a driveline from the motor to driving wheels through the automatic transmission for connecting/disconnecting the motor and the driving wheels, and having the following drive modes:
a first drive mode in which the first engagement element is disengaged and the second engagement element is engaged then the vehicle travels by only a driving force of the motor,
a second drive mode in which the first and second engagement elements are respectively engaged then the vehicle travels by both driving forces of the engine and the motor, and
a third drive mode in which at least the second engagement element is slip-engaged then the vehicle travels by a driving force transmitted through the second engagement element,
the method comprising:
changing the drive mode according to a vehicle travel state;
detecting a deceleration of the vehicle;
performing a coast-down shift which changes a transmission ratio of the automatic transmission to a lower transmission ratio upon deceleration of the vehicle;
predicting whether or not an engine stall occurs, on the basis of the vehicle deceleration and a state of the coast-down shift, during a travel in the second drive mode; and
disengaging at least one of the first and second engagement elements when the occurrence of the engine stall is predicted.

* * * * *